United States Patent [19]
Griebler et al.

[11] Patent Number: 5,503,680
[45] Date of Patent: Apr. 2, 1996

[54] STABILIZED STARCH, USE OF THE STABILIZED STARCH AND METHODS OF PRODUCING IT

[75] Inventors: Wolf-Dieter Griebler; Djamschid Amirzadeh-Asl, both of Moers, Germany

[73] Assignee: Metallgesellschaft Aktiengesellschaft, Frankfurt am Main, Germany

[21] Appl. No.: 211,512

[22] PCT Filed: Oct. 1, 1992

[86] PCT No.: PCT/EP92/02270

§ 371 Date: May 25, 1994

§ 102(e) Date: May 25, 1994

[87] PCT Pub. No.: WO93/07207

PCT Pub. Date: Apr. 15, 1993

[30] Foreign Application Priority Data

Oct. 11, 1991 [DE] Germany .................. 41 33 680.1

[51] Int. Cl.$^6$ .................. C08B 30/00; C08B 30/12; C13D 3/12; C09D 4/00
[52] U.S. Cl. .................. 127/67; 127/32; 127/55; 127/70; 127/71; 106/210
[58] Field of Search .................. 127/32, 67, 55, 127/70, 71; 106/210; 427/212

[56] References Cited

U.S. PATENT DOCUMENTS

| | | | |
|---|---|---|---|
| 1,432,440 | 10/1922 | Burmeister | 427/212 |
| 2,614,945 | 10/1952 | Krisan | 427/212 |
| 3,377,171 | 4/1968 | Ryan et al. | 127/71 |
| 3,467,543 | 9/1969 | Campbell | 127/71 |
| 3,928,055 | 12/1975 | Brailsford et al. | 127/71 |
| 3,930,101 | 12/1975 | Vincent | 427/212 |
| 4,969,955 | 11/1990 | Rudin | 427/212 |

*Primary Examiner*—Paul Lieberman
*Assistant Examiner*—Patricia L. Hailey
*Attorney, Agent, or Firm*—Michael J. Striker

[57] ABSTRACT

The method of making a stabilized starch includes mixing an aqueous starch suspension having a starch concentration of from 5 to 50 % by weight with an aqueous metal salt solution which contains from 10 to 50 % by weight of at least one metal salt selected from the group consisting of $TiOSO_4$, $TiOCl_2$, $Al_2(SO_4)_3$, $NaAlO_2$, $Fe(NO_3)_3$, $FeSO_4$, $ZnCl_2$, $Na_2SiO_3$, $SbCl_3$, $ZrOSO_4$, $ZrOCl_2$, $MgCl_2$ and $SnCl_4$ with a starch-suspension-to-metal-salt-solution ratio of from 1:5 to 10:1, to form a mixture having a pH of from 3 to 10 and containing the stabilized starch; and after the mixing of step a), separating the stabilized starch from the mixture and washing and drying it. The starch suspension preferably contains starch particles having a particle size of from 1 to 150 microns.

4 Claims, No Drawings

STABILIZED STARCH, USE OF THE STABILIZED STARCH AND METHODS OF PRODUCING IT

The invention is directed to a stabilized starch, use of the stabilized starch and methods for producing it.

As a natural and inexpensive raw material, starch has many industrial uses. In addition to the use of starch in the foodstuffs industry, e.g., for fabricating starch sugar, glucose syrup, dextrin, puddings, potato sago and licorice, starch is used in the production of pastes and glues, as paper additives, e.g. as sizes for paper, as thickening agents for printing inks and as soap additives. Further, starch products, as natural polymers, are combined with synthetic polymers to improve their characteristics. However, in so doing, the mechanical properties of the synthetic polymers are disadvantageously impaired by combining with starch. Moreover, starch decomposes in its monosaccharides at high temperatures so that it is only possible to use copolymers formed from synthetic polymers and starch at temperatures below approximately 190° C. In addition, starch has a relatively low resistance to chemicals, which causes problems in the industrial use of starch.

The object of the invention is to provide a stabilized starch which has a high thermal, mechanical and chemical stability and can be used in many ways. Further, the invention also has the object of providing methods for the production of stabilized starch which can be carried out easily and quickly.

The object upon which the invention is based is met in that the stabilized starch is formed from a substrate of starch which is surrounded by a protective layer of inorganic metal compounds.

By starch is meant amylose or amylopectin or a mixture of amylose and amylopectin. Amylose is unbranched and contains on the average 300 glucopyranose molecules. Amylopectin is composed of branched macromolecules with over a thousand glucose molecules. Rice starch, potato starch, wheat starch, and preferably maize or corn starch can be used as a mixture of amylose and amylopectin. Rice starch, potato starch, wheat starch and corn starch are generally composed of 20 to 30% amylose and 70 to 80% amylopectin. Metal oxides, metal hydroxides, metal phosphates, metal sulfides or metal carbonates, for example, can be used as inorganic metal compounds. Surprisingly, it has now been shown that the stabilized starch achieves high thermal, mechanical and chemical resistance as a result of the protective layer without modification of the polymer structure of the starch. The porosity, coarseness, absorption capacity and dispersion capacity of the stabilized starch can be adapted to a relatively great number of applications in an advantageous manner through the selection of the material of the protective layer and selection of the thickness of the protective layer.

In a preferred form of the invention, $TiO_2$ or $TiO(OH)_2$ or $Al_2O_3$ or $Al_2(OH)_6$ or FeO or $Fe_2O_3$ or $Fe(OH)_3$ or ZnO or $ZnO(OH)_2$ or ZnS or $ZrO_2$ or $Zr(OH)_4$ or $ZrO(OH)_2$ or MgO or $Mg(OH)_2$ or $SnO_2$ or $Sn(OH)_4$ or $SiO_2$ or $BaSO_4$ or $Sb_2O_3$ or mixtures thereof are used as inorganic metal compounds. A high dispersion capacity of the stabilized starch in plastics is achieved by this step.

Another preferred form of the invention consists in that the proportion of the protective layer on the stabilized starch is 0.5 to 40 percent by weight. A particularly high mechanical stability of the starch is achieved by this step.

According to another form of the invention, the proportion of the protective layer on the stabilized starch is 1 to 30 percent by weight. The stabilized starch accordingly has a relatively high thermal stability and the proportion of the protective layer on the stabilized starch is relatively small so that the price of the stabilized starch can be kept low without negatively affecting the quality of the stabilized starch.

The object upon which the invention is based is met also in a method for producing stabilized starch in which an aqueous starch suspension with a starch concentration of 5 to 50% is mixed with an aqueous metallic salt solution containing $TiOSO_4$ or $TiOCl_2$ or $Al_2(SO_4)_3$ or $NaAlO_2$ or $Fe(NO_3)_3$ or $FeSO_4$ or $ZnCl_2$ or $Na_2SiO_3$ or $SbCl_3$ or $ZrOSO_4$ or $ZrOCl_2$ or $MgCl_2$ or $SnCl_4$ or mixtures thereof in a metallic salt concentration of 10 to 50 percent by weight, at a pH of 3 to 10 in a ratio of the starch suspension to the metallic salt solution of 1:5 to 10:1 and the stabilized starch is then separated, washed and dried. Surprisingly, it has been shown that the individual particles of the starch suspension can be enveloped uniformly with a closed protective layer by using this method. The stabilized starch produced by this method therefore has a particularly high chemical stability.

The object upon which the invention is based is further met by a method for producing stabilized starch in which an aqueous starch suspension with a starch concentration of 5 to 50% is mixed with a second suspension containing particles of $TiO_2$ or $TiO(OH)_2$ or $TiO(OH)_4$ or ZnO or ZnS or $BaS_4$ or $Fe(OH)_3$ or $Fe_2O_3$ or $SiO_2$ or $Al_2O_3$ or $Al(OH)_3$ or $Sb_2O_3$ or $ZrO_2$ or mixtures thereof in a concentration of 10 to 50 percent by weight, at a pH of 4 to 9 in a volume ratio of the starch suspension to the second suspension of 1:1 to 10:1 and the stabilized starch is then separated and dried. The advantage of this method consists in that a stabilized starch can be produced in which the individual particles in the protective layer are arranged relatively densely by addition to the substrate of starch so that tile stabilized starch also has a particularly high mechanical stability in addition to a relatively high thermal and chemical stability.

According to another form of the invention, the pH is 5 to 8. This has the advantage that the starch substrate can be surrounded by a protective layer in a relatively short amount of time.

According to another form of the invention, the particle size of the starch suspension is 1 to 150 μm. If the size of the particles of the starch suspension is 1 to 150 μm, a stabilized starch can be produced which can be combined with synthetic polymers in a simple manner.

Another form of the invention consists in that the size of the particles of the starch suspension is 5 to 25 μm. In this way, a stabilized starch can be produced for a relatively great number of uses.

According to another form of the invention, the average particle size in the second suspension is 0.02 to 3 μm. In this way, addition of the particles of the second suspension to the starch substrate can be effected in a uniform manner so as to achieve a homogeneous distribution of the particles of the second suspension in the protective layer.

According to another form of the invention, the average particle size of the second suspension is 0.02 to 1 μm. This has the advantage that the particles of the second suspension are arranged homogeneously in the protective layer and the protective layer has a relatively high density.

According to another form of the invention, the stabilized starch is used as filler or pigment in plastics, paper, shellacs, paints, cosmetics, photochemical materials or pharmaceutical products. The quality of plastics, paper, shellacs, paints, cosmetics, photochemical materials or pharmaceutical products can be improved in this way.

The invention is explained in more detail with reference to the following examples.

EXAMPLE 1

100 g corn starch with a particle diameter of 10 to 25 μm are stirred into 400 ml water. The starch suspension obtained in this way has a pH of 5.1. 160 ml of a suspension containing 15 percent by weight $TiO_2$ and having a pH of 6.3 is then added to the starch suspension during 5 minutes. The mixture is stirred for 1 hour. The stabilized starch is then filtered and dried.

EXAMPLE 2

To produce a titanium oxide hydrate suspension, 1000 ml of a hydrochloric acid solution containing 85 g of $TiOCl_2$ and having a pH of 1 are neutralized to pH 7 with 1500 ml of 10-percent NaOH over a period of 50 minutes, then filtered and washed. The salt-free titanium oxide hydrate and water produce a titanium oxide hydrate suspension with a concentration of 10 percent by weight with respect to the $TiO_2$ content. 100 ml of this suspension are stirred into a starch suspension containing 100 g corn starch in 400 ml water over a period of 5 minutes. The mixture is stirred for 60 minutes. The stabilized starch is then separated and dried at 105° C.

EXAMPLE 3

100 g of corn starch are dispersed in 500 ml water. The pH of the suspension is adjusted to 7 with 1 ml of a 10-percent NaOH solution. Following this, 110 ml of a $TiOCl_2$ solution containing 18.6 g $TiOCl_2$ is added during 45 minutes. A 10-percent NaOH solution is added at the same time so that the pH is adjusted to 6 to 8. After stirring for 60 minutes, the stabilized starch is filtered, washed and dried.

EXAMPLE 4

250 g of corn starch are dispersed in 500 ml water. 130 ml of a suspension containing 37.5 g $TiO_2$ with an average particle size of 0.1 μm are added to this starch suspension. After stirring for 1 hour, the product is filtered and dried.

EXAMPLE 5

A suspension of 250 g of corn starch in 500 ml water is produced. Then, 150 ml of a suspension containing 40 g of ZnO are added over a period of 5 minutes. The stabilized starch is filtered and dried after stirring for 60 minutes.

EXAMPLE 6

250 g of corn starch are dispersed in 500 ml water. A ZnS suspension containing 44.4 g of ZnS in 120 ml water is then added to this starch suspension during 5 minutes. After stirring for 60 minutes, the stabilized starch is filtered and dried.

EXAMPLE 7

400 g of corn starch are dispersed in 8000 ml water. 7200 ml of a titanium oxide hydrate suspension with a concentration—with respect to the $TiO_2$ content—of 7.7 percent by weight are then added over a period of 45 minutes. The stabilized starch is then spray dried. The dried stabilized starch contains 12 percent by weight $TiO_2$ and has a specific surface of 41 $m^2/g$ which is determined by the BET method. Examination of the stabilized starch under a scanning electron microscope reveals that the corn starch is surrounded by a protective layer of $TiO_2$. For analysis of mechanical stability, 20 g of stabilized starch are milled in a ball mill for 2 hours using porcelain balls with a diameter of 20 mm. Examination of the milled stabilized starch by a scanning electron microscope reveals that the corn starch is still almost completely enveloped by the protective layer of $TiO_2$ even after the mechanical loading in the ball mill. In contrast to untreated corn starch, the dried stabilized starch can easily be worked into polyethylene, since the protective layer of $TiO_2$ prevents the decomposition of the corn starch as a result of the high temperatures of more than 190° C. at which it is worked into polyethylene. Untreated corn starch decomposes when worked into polyethylene, which results in an undesirable brown coloring of the polyethylene mixed with starch.

What is claimed is:

1. A method of making a stabilized starch, said method comprising the steps of:
    a) mixing an aqueous containing starch particles having a starch concentration of from 5 to 50% by weight with an aqueous metal salt solution, said aqueous metal salt solution containing from 10 to 50% by weight of at least one metal salt selected from the group consisting of $TiOSO_4$, $TiOCl_2$, $Al_2(SO_4)_3$, $NaAlO_2$, $Fe(NO_3)_3$, $FeSO_4$, $ZnCl_2$, $Na_2SiO_3$, $SbCl_3$, $ZrOSO_4$, $ZrOCl_2$, $MgCl_2$ and $SnCl_4$, wherein said aqueous starch suspension and said aqueous metal salt solution are mixed in a ratio of said aqueous starch suspension to said metal salt solution of from 1:5 to 10:1, wherein said at least one metal salt forms a protective layer on said starch particles in said starch suspension to form a stabilized starch mixture, said starch mixture having a pH of from 3 to 10 and containing a stabilized starch;
    b) after said mixing of step a), separating said stabilized starch from said mixture and washing and drying said stabilized starch separated from said mixture.

2. A method as defined in claim 1, wherein said pH of said mixture is between 5 and 8.

3. A method as defined in claim 1, wherein said starch particles have a particle size of from 1 to 150 microns.

4. A method as defined in claim 1, wherein said starch particles have a particle size of from 5 to 25 microns.

* * * * *